United States Patent
Haik et al.

(10) Patent No.: US 11,323,574 B2
(45) Date of Patent: May 3, 2022

(54) DETERMINING DEFECTS HAVING A CHARACTERISTIC SEPARATION DISTANCE

(71) Applicant: HP Indigo B.V., Amstelveen (NL)

(72) Inventors: Oren Haik, Ness Ziona (IL); Oded Perry, Ness Ziona (IL); Avi Malki, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 17/032,472

(22) Filed: Sep. 25, 2020

(65) Prior Publication Data

US 2021/0014360 A1 Jan. 14, 2021

Related U.S. Application Data

(63) Continuation of application No. 16/346,318, filed as application No. PCT/EP2017/051194 on Jan. 20, 2017, now Pat. No. 10,805,477.

(51) Int. Cl.
*H04N 1/00* (2006.01)

(52) U.S. Cl.
CPC ..... *H04N 1/00018* (2013.01); *H04N 1/00034* (2013.01); *H04N 1/00037* (2013.01); *H04N 1/00045* (2013.01)

(58) Field of Classification Search
CPC .................................................. H04N 1/00018
USPC ........................................................ 358/474
See application file for complete search history.

(56) References Cited

U.S. PATENT DOCUMENTS

| 5,168,373 | A  | ‡ | 12/1992 | Nakamura | H04N 1/00002 358/40 |
| 7,516,040 | B2 | ‡ | 4/2009 | Leute | B41J 29/393 101/17 |
| 7,519,222 | B2 | ‡ | 4/2009 | Kisilev | G06T 7/001 382/19 |
| 8,259,350 | B2 | ‡ | 9/2012 | Wu | H04N 1/32635 358/1 |
| 9,235,885 | B2 | ‡ | 1/2016 | Amzaleg | G06T 7/001 |
| 9,367,911 | B2 | ‡ | 6/2016 | Dalla-Torre | G06T 7/001 |
| 2009/0180680 | A1 | * | 7/2009 | Satou | G06T 7/001 382/144 |
| 2010/0177330 | A1 | * | 7/2010 | Wu | H04N 1/00005 358/1.9 |

(Continued)

OTHER PUBLICATIONS

Vans, M. et al., Automatic Visual Inspection and Defect Detection on Variable Data Prints, Jun. 21, 2010 < http://www.hpl.hp.com/techreports/2008/HPL-2008-163R1.pdf>.‡

(Continued)

*Primary Examiner* — Jacky X Zheng

(74) *Attorney, Agent, or Firm* — Michael A Dryja

(57) ABSTRACT

A first separation distance is determined between a first pair of defects in a scanned image of a first printed sheet, and a second separation distance is determined between a second pair of defects in a scanned image of a second printed sheet. The defects are determined as having a separation distance in that the first and second separation distances are each within a first threshold of a specified separation distance and/or a difference between the first and second separation distances is below a second threshold. A source of the defects can be determined based on the characteristic separation distance.

20 Claims, 5 Drawing Sheets

Determine separation distance between defects in scanned image of a printed substrate bearing a printed image in predetermined direction — 102

Determine if defects have characteristic separation distance — 104

(56) References Cited

U.S. PATENT DOCUMENTS

2011/0019244 A1\* 1/2011 Uwatoko ............. H04N 1/0009
358/448
2017/0083734 A1\* 3/2017 Unemyr ............... G06K 7/1443

OTHER PUBLICATIONS

Vans, M. et al., Automatic Visual Inspection and Defect Detection on Variable Data Prints, Jun. 21, 2010 https://www.hpl.com/techreports/2008/HPL-2008-163R1.pdf.

\* cited by examiner
‡ imported from a related application

DETERMINING DEFECTS HAVING A CHARACTERISTIC SEPARATION DISTANCE

BACKGROUND

In printing, print agents such as inks, toners, coatings and the like, may be applied to a substrates. Substrates may in principle comprise any material, for example comprising paper, card, plastics, fabrics or the like.

In some examples, the resulting print may be analysed in order to identify potential or actual defects. In some examples, a printed substrate is scanned, and the captured image is compared to a reference image, for example an image which formed the basis of a print instruction, or previously printed image which has been determined to meet certain criteria.

BRIEF DESCRIPTION OF THE DRAWINGS

Non-limiting examples will now be described with reference to the accompanying drawings, in which.

DETAILED DESCRIPTION

In some cases, a printed image may be analysed to detect defects therein. There are many potential sources of defects in an image, for example aging or failing print apparatus components, damaged or inappropriate substrates or coatings, inappropriate ink (or other print agent) compositions, a need to clean the apparatus, and the like. Thus, even if a user is made aware of a defect, it may not be clear what remedial action may be applied, or whether the defect is a result of transient conditions and will resolve itself.

This can lead to wasted time in determining the source of a defect and, in the event of mis-diagnosis of the fault, inappropriate and potentially expensive maintenance operations.

Figure 1:
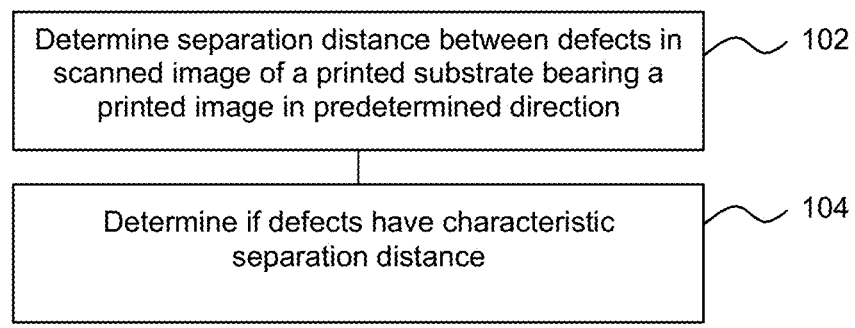
FIG. 1 is a flowchart of an example method of detecting defects having a characteristic separation distance.

FIG. 1 is an example of a method, which may be a method of identifying defects having a characteristic separation distance. In some examples, the characteristic separation distance may be characteristic of a source of the defects. The method may in some examples be a computer implemented method.

Block 102 comprises determining, by a processor, at least one separation distance in at least one scanned image of a printed substrate sheet bearing a printed image. The separation distance between defects is determined in a predetermined direction.

In some examples, the predetermined direction may be a direction parallel to a direction of transport of the printed substrate through a print apparatus. In other examples, the predetermined direction may be the direction of transport of the printed substrate through a scanner, or any other substrate handling apparatus. In some examples, the predetermined direction may be a direction determined by the orientation of the image, the direction being parallel to, perpendicular to, or at any other angle to an edge of the image.

In some examples, image(s) may for example be acquired by scanning one or a plurality of printed substrate sheets bearing printed images. For example, such images may be acquired by scanning apparatus, which may be operatively connected to a processor carrying out the method. In some examples, such a processor may comprise a component of print apparatus or scanning apparatus (and some apparatus for printing images may incorporate both print apparatus and scanning apparatus). In some examples, the scanned image may be acquired from a memory, which may be local or remote, and/or maybe received over a network, or the like.

In some examples, the method may comprise identifying, by the processor, defects in at least one printed image. This may comprise comparing the scanned image to reference image data, for example on a pixel by pixel, or patch by patch, basis. Reference image data may for example comprise the image data used to determine the print instructions to print the printed substrate sheet, or may be based on a previously printed image (which may for example have been reviewed and determined to be satisfactory). In other examples, the analysis may be carried out according to some other predetermined criteria, such as an intended mattness of the image, or color consistency, or the like.

Where a scanned image of a plurality of printed substrate sheets has been obtained, defects may be detected on a plurality of sheets such that at least one defect is identified on a first substrate sheet and at least one defect is identified on a second substrate sheet.

In some examples, identifying defects may be a binary analysis: a defect is either determined to be present or absent. In other examples, a degree of deficiency may be evaluated, i.e. a measure of the difference between the printed image and the intended image. In some examples, a certainty level may be assigned, i.e. there is an x % probability that an image pixel or patch has not printed as intended. This allows for some uncertainty to be introduced for example to reflect that the apparent defect may be an error in image capture rather than in printing. In such examples, defect values (which may be binary or weighted by the degree of deficiency or certainty associated therewith) may be determined for each of a plurality of pixels. The defect values may be stored in, or used to determine, a defect 'map', in which the location of the defects on a printed substrate sheet is held.

For example, this may comprise identifying defects which have at least a threshold value indicative of a printing deficiency (for example, defects associated with a value which is above a threshold defect/probability value may be considered), and determining a separation distance between defects based on an identified position of said defects. In some examples, a separation distance may be determined between any two defects. In other examples, a separation distance may be determined for two defects with a common attribute, for example defects which are substantially aligned in the predetermined direction, are on the same printed substrate sheet, are within a certain proximity to each other, and/or are of a common, or similar, shape and/or size.

While in some examples, the method may comprise acquiring an image and/or determining defects, in other examples, the method may be carried out with reference to defects which have been predetermined.

Block 104 comprises determining if the defects have a characteristic separation distance. As is explained in greater detail below, this may be a separation distance which is characteristic of a defect source.

Print apparatus may include components, such as drums, rollers, reciprocating arms and the like, which can, if contaminated with print agent, or in some way defective, result in periodic defects (i.e. in a defect which recurs with a particular periodicity) in a printed images. For example, a print agent application unit (for example, a 'binary ink developer (BID)') may be used to apply print agent to a photoconductive drum via a roller, although other configurations, such as those using belts and/or flat surfaces and the like, may be used. Such components may have a finite life span, and may be replaced when damaged or failing. A defect in a roller, for example, may be seen as a periodic defect on a printed image, which could appear multiple times within the same image. Therefore, a print agent application unit may be the source of a periodic defect having a characteristic separation distance. Correctly diagnosing a defect as being due to, for example, print agent application unit failure can reduce time, complexity and cost of repair. Other components may be associated with other characteristic separation distances based on their geometry and/or the role they play in print operations.

In some examples, therefore, the characteristic separation distance may be associated with a print apparatus component. For example, the separation distance may be a characteristic of a dimension of a part of a print apparatus, such as a circumference of a roller, or the length of an endless belt, or the like.

In some examples, the characteristic separation distance may be empirically predetermined, based on measurements of separation distances between defects and a diagnosis by a user, or may be determined based on a geometry of a component or its interactions with the substrate in the print process, or the like. In other examples the characteristic separation distance may be entered manually by an operator/user, or determined in some other manner. At least one characteristic separation distance value may be stored, for example in a look up table, and defects may be characterised as a having a characteristic separation distance if the defects are separated by a stored distance value.

If a user could reliably identify a defect as arising from a component, for example a print agent application unit, this could be resolved by replacing or servicing the identified component, and may avoid 'trial and error' servicing. Therefore, identifying specifically periodic defects as having a characteristic separation distance may allow diagnosis of a fault and/or a specification of a remedial action to be carried out. Accurate diagnosis of a defect generally allows for quicker repair and therefore higher print apparatus utilisation.

In some examples, the method of FIG. 1 may be carried out 'on-the-fly', i.e. during a print run, to provide an operator with information about the print operation while it is on-going.

The characteristic separation distances may vary between print apparatus, based on the components thereof. Therefore, in some examples, characteristic separation distances may be provided for a particular print apparatus (or class of print apparatus, in some cases having a particular configuration).

Figure 2:
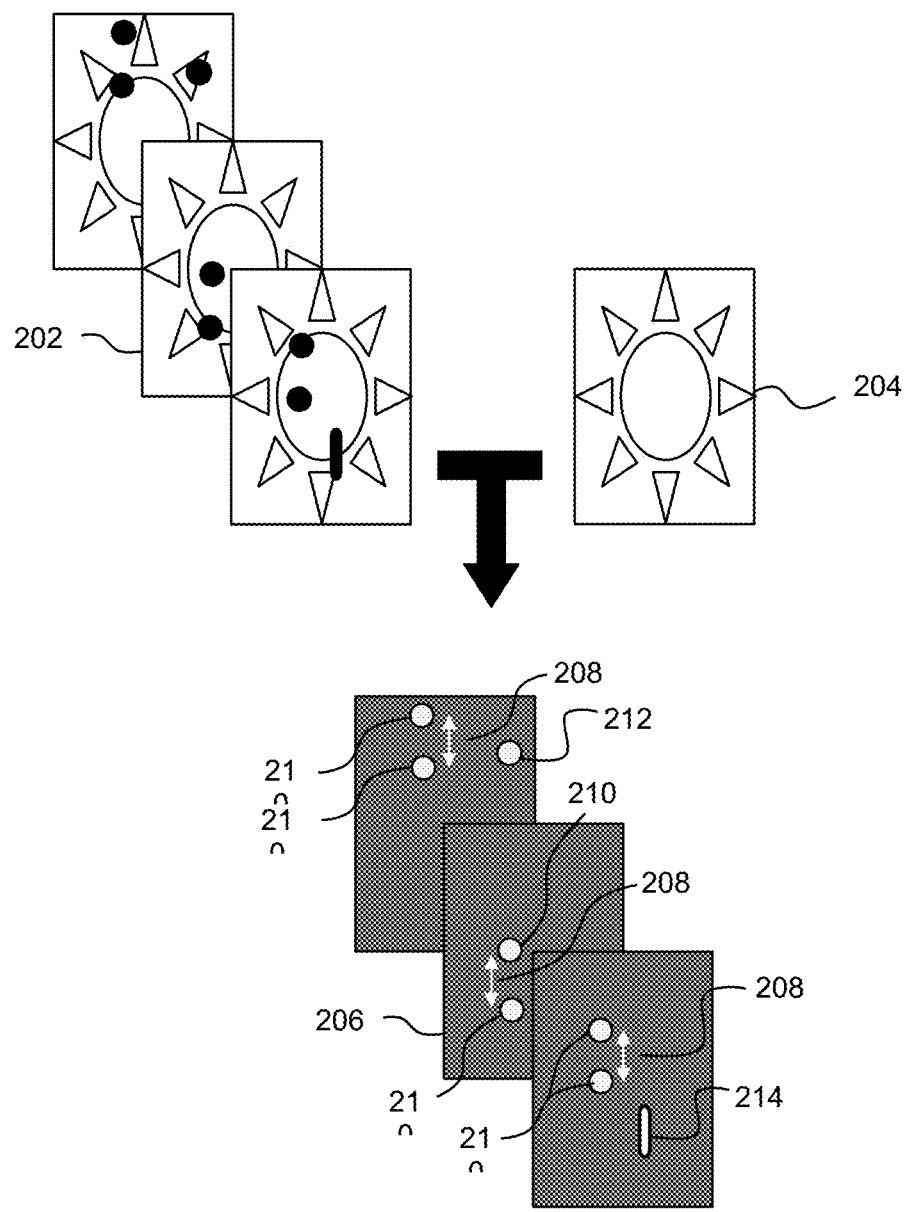
FIG. 2 a schematic representation of an example method of detecting defects having a characteristic separation distance.

FIG. 2 shows a schematic example of a method of detecting distances having a characteristic separation distance. Sheets 202 may be printed, and compared to common reference image 204. Although in this case a common reference image is used, the sheets could be printed according to different print instructions and bear different images, in which case the reference image would also differ according to the print instructions.

Defect maps 206 are produced as a result of the comparison. The defect maps represent, for each xy location in the xy plane of the sheet, a value giving an indication of a detected degree of a deficiency in printing. This may be indicated in grey scale, for example with map portions being indicative of a more severe defect (i.e. a larger distinction between the intended and printed image at this point).

A separation distance 208 between defects 210 may be determined in a predetermined direction. Defects having a characteristic separation distance may then be identified, for example by reference to a lookup table.

In some examples, any separation distance sufficiently close (for example within a predetermined tolerance) to a characteristic separation distance will result in defects being identified as defects having the characteristic separation distance (i.e. as 'periodic' defects). The tolerance may for example be determined empirically, or may be based on predetermined tolerances in the printing or other substrate handling apparatus, may be generated dynamically for example by comparison with an average value, which may be based on a standard deviation or the like, or may be determined in some other way. Such a tolerance may be determined in order to reduce the number of false positives, or to increase the defect detection rate.

In some examples, a plurality of pairs of defects may be considered and if a threshold number of the pairs (for example, 2, 3, 5, 10 or more) have, to within a predetermined tolerance, the characteristic separation distance will result in defects being identified as defects having the characteristic separation distance. Using multiple pairs may reduce error rate, for example false positives.

Other attributes of the defect may also be considered, such as at least one of the linear alignment, size and/or shape of the region of the printed substrate sheet comprising defect. For example, defects of the type referred to as 'periodic defects' herein may be aligned in the direction of transport though a print apparatus (i.e. as shown in FIG. 2, the defects 210 may have roughly the same horizontal position on the page). For example, FIG. 2 further shows further defects 212 and 214, which have a different horizontal position. In some examples, the separation of these defects 212, 214 and any other defect would not be considered, as there are no other defects linearly aligned therewith in the predetermined direction (which in this example is vertically on the page).

In some examples, the defects to be considered have substantially similar forms to one another (for example, a round defect and a linear defect may be less likely to be periodic defects of the type considered herein when compared to two round defects of similar size). For example, while the defects 210 are largely similar in form, the defect 214 is of a notably different form. In some examples, the separation of this defect 214 and any other defect would not be considered, as there are no other defects having a similar form.

Figure 3:
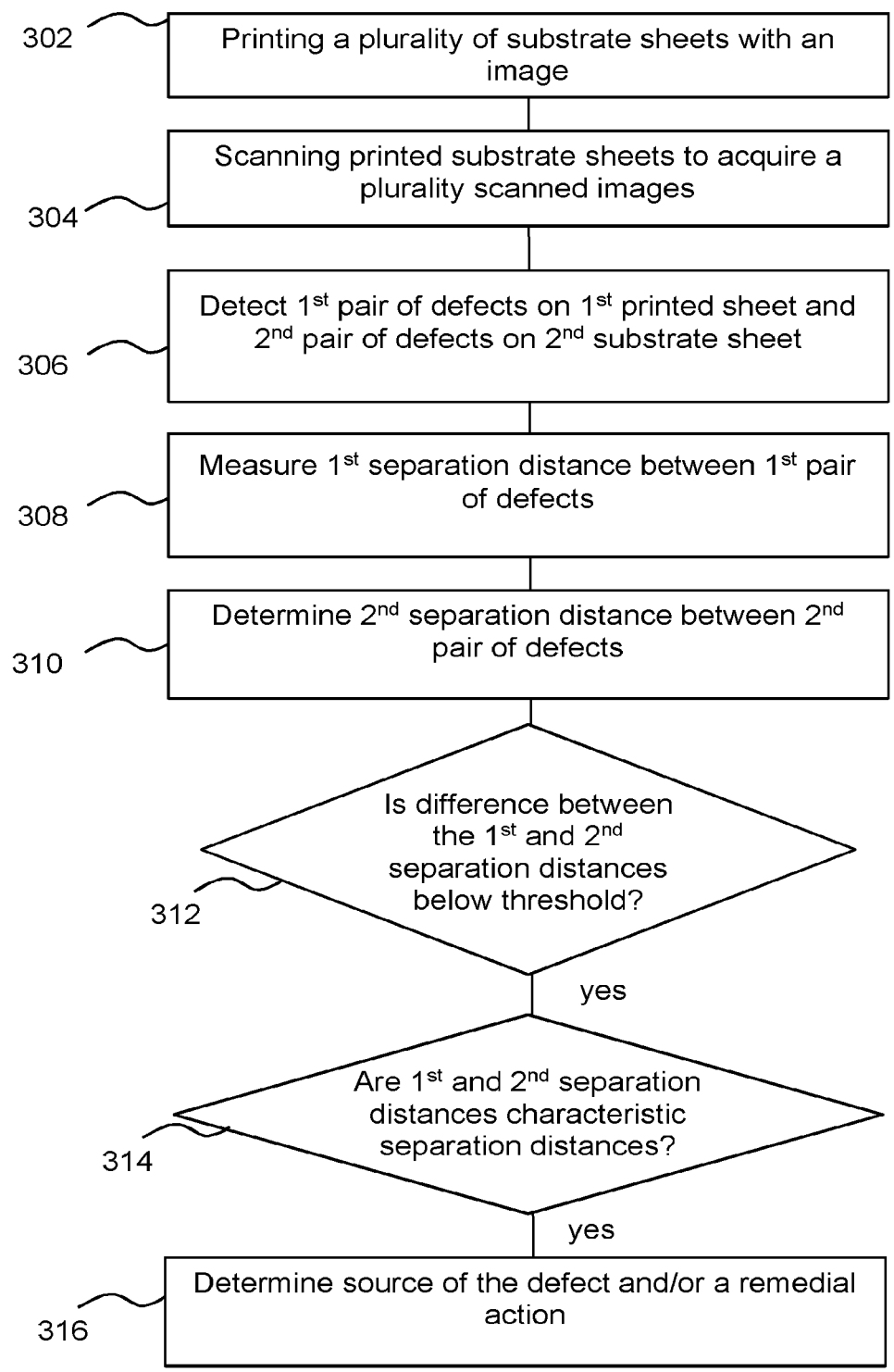
FIG. 3 is a flowchart of another example method of detecting defects having a characteristic separation distance.

FIG. 3 is an example of a method which in block 302 comprises printing a plurality of substrate sheets with an image. Block 304 comprises scanning printed substrate sheets to acquire a plurality of scanned images.

In this example, in block 306, a first pair of defects is detected on a first printed sheet and a second pair of defects is detected on a second substrate sheet. The method continues with block 308, which comprises measuring a first separation distance between the first pair of defects. In some examples, the first pair of defects may be selected based on their alignment in the predetermined direction, shape, size, or any other attribute. In some examples the separation distance in the predetermined direction between all defects within a scanned image will be determined.

Block 310 comprises determining a second separation distance between the second pair of defects. The second pair of defects may be determined as described above for selecting the first pair of defects. In some examples, the position of the first pair of defects may be considered when selecting the second pair of defects. In some examples the second pair of defects may be in substantially the same horizontal position within the image, but located in a different vertical position relative to the first pair of defects. In other examples the second pair of defects may be a similar size or shape, or have some other similar attribute, to the first pair of defects. In some examples, it may be the case that 'periodic defects' are more likely to occur at a specific position of a sheet or with a specific separation.

In this example, the first and second pairs of defects may be on different printed substrate sheets. However, in some examples the first and second pairs of defects may be on the same printed substrate sheet. In some such examples the first and second pairs of defects may have a defect in common.

The method may comprise determining separation distances between any number of pairs of defects. Determining separation distances between a higher number of pairs of defects may improve accuracy and reduce error rates.

Block 312 comprises comparing the first separation distance and the second separation distance to determine if the difference between the first and second separation distances is below a threshold. If so, the method continues with block 314, in which it is determined whether the first and second separation distances are a characteristic separation distance in a predetermined direction (for example by comparison to a look-up table or the like). Therefore, in this example, the determination as to whether the periodic defect is associated with a known spacing (and thereby a predetermined defect source) is conditional on positive detection of a defect which has recurred at least a threshold number of time with a particular spatial separation or periodicity.

If the defects are determined in block 314 to have a characteristic separation distance, block 312 comprises determining at least one of a source of the defects and a remedial action. This may comprise, for example, consulting a look-up table relating a particular separation distance to a source, or likely source thereof. In some examples, this information may be presented to a user (who may be local to the print apparatus or remote therefrom). In some examples, a remedial action to address the cause of the defects may be identified. For example, this may specify that at least one component should be replaced, serviced, cleaned or the like.

If the determination in block 312 or 314 is negative, it may be determined that the defects are not separated by a characteristic separation distance; i.e. in some such examples it may be concluded that the separation of those defects cannot (at least, not automatically in this example) be used to determine a source of the defects.

Figure 4:
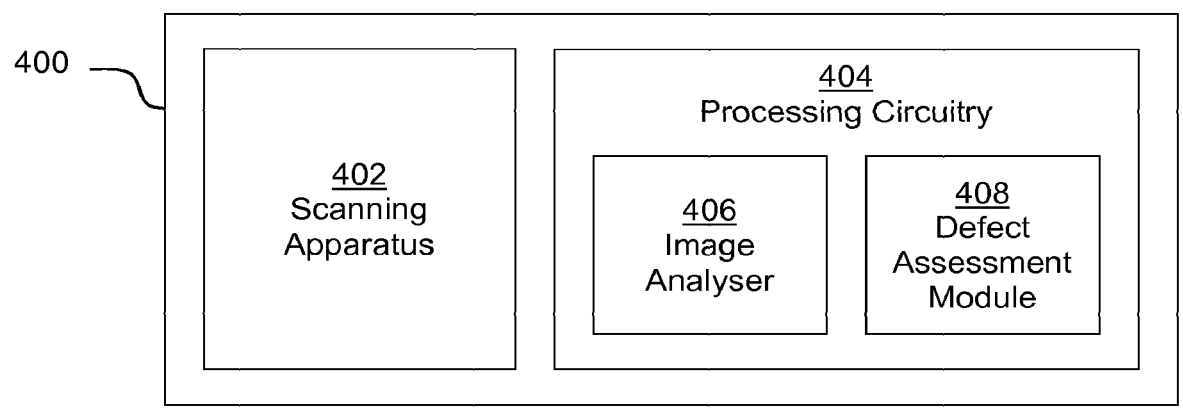
FIG. 4 is a diagram of example apparatus.

FIG. 4 is an example of an apparatus 400 comprising a scanning apparatus 402 to scan a printed image and processing circuitry 404.

The scanning apparatus 402 is operable to scan a plurality of printed images and may be any scanning apparatus suited to the purpose of capturing images of printed pages.

The processing circuitry 404 comprises an image analyser 406, which, in operation, locates defects in a plurality of printed images and a defect assessment module 408, which, in operation, identifies defects having a spatial periodicity (i.e. 'periodic defects', or defects having a repeated or recurring separation distance) by measuring a separation of defects on multiple scanned images. For example, this may comprise considering the spacing between a pluralities of 'pairs' of defects.

In some examples, the image analyser 406 may determine a defect map indicative of the locations of defects within each printed image. In some examples, the defect assessment module 408 is to determine if the defects within at least one defect map have a spatial periodicity.

In some examples, the defect assessment module 408 is to categorise defects as having a spatial periodicity as periodic defects if the defects have a characteristic spatial periodicity in a direction of transport of a substrate sheet bearing the printed image through a print apparatus. In some examples, the defect assessment module 408 may in some examples determine a source of the defects by comparing the spatial periodicity to at least one predetermined spatial periodicity (which may for example be stored in a memory). The defect assessment module 408 may categorise the defect as originating from a particular source, for example as likely being due to a print apparatus component which is associated with defects having that separation distance. A defect may be categorised based on a predetermined spatial frequency. In some examples, the defect assessment module 408 may categorise a defect as a print agent application unit defect if the spatial periodicity corresponds to a predetermined spatial periodicity associated with a print agent application unit. However, a periodic defect may in principle be associated with any of a range of components within the print apparatus. The predetermined spatial frequency may be related to a characteristic of the print apparatus, for example it may related to a circumference of a roller, length of an endless belt within print apparatus or the action of a reciprocating component.

In some examples, the processing circuitry 404 may carry out at least one block of FIG. 1 or FIG. 3.

Figure 5:
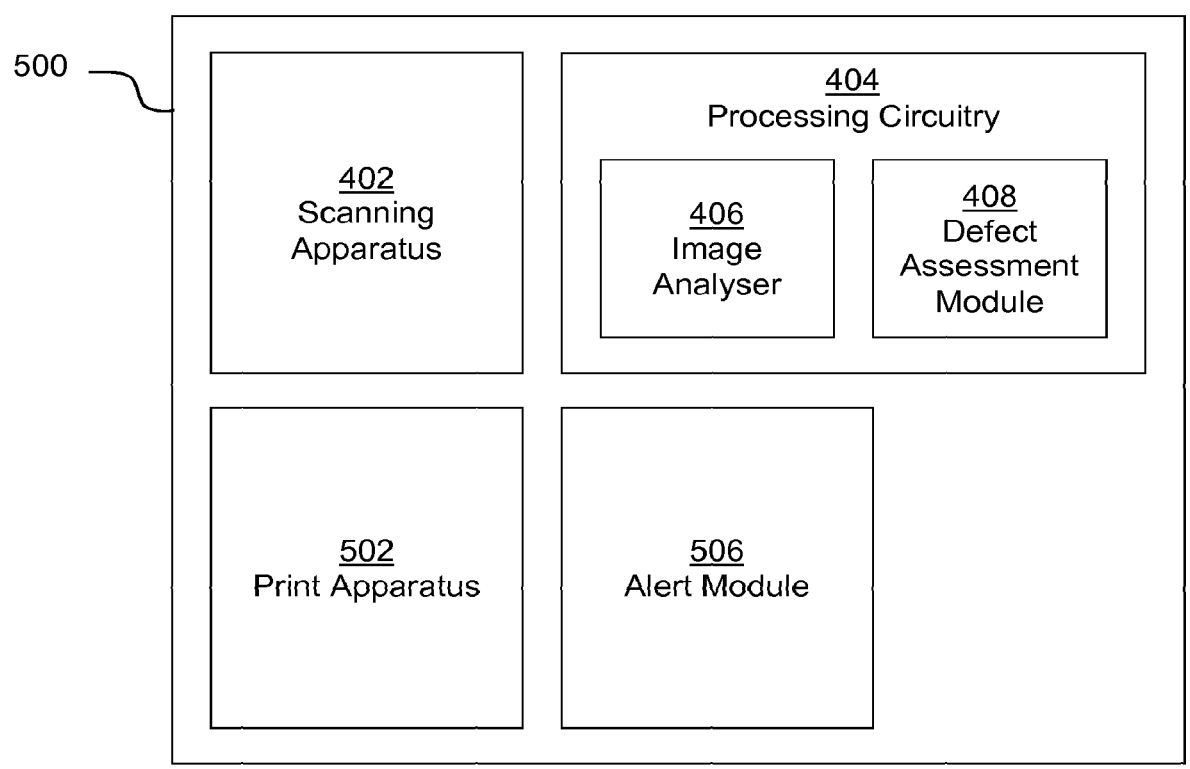
FIG. 5 is a further example of an apparatus.

FIG. 5 is an example of an apparatus 500, which comprises the components of apparatus 400, and additionally a print apparatus 502 and an alert module 506.

In some examples, the print apparatus 502 is a Liquid Electro Photographic (LEP) printing apparatus which may be used to print a print agent such as an electrostatic ink composition (or more generally, an electronic ink). In such examples, a photo charging unit may deposit a substantially uniform static charge on a photoconductor, for example is a photo imaging plate, or 'PIP' and a write head dissipates the static charges in selected portions of the image area on the PIP to leave a latent electrostatic image over. The latent electrostatic image is an electrostatic charge pattern representing the pattern to be printed. The electrostatic ink composition is then transferred to the PIP from a print agent source, which may comprise a print agent application unit such as a Binary Ink Developer (BID) unit, and which may present a substantially uniform film of the print agent to the PIP. A resin component of the print agent may be electrically charged by virtue of an appropriate potential applied to the print agent in the print agent source. The charged resin component, by virtue of an appropriate potential on the electrostatic image areas, is attracted to the latent electrostatic image on the PIP. The print agent does not adhere to the charged, non-image areas and forms an image on the surface of the latent electrostatic image. The photoconductor will thereby acquire a developed print agent electrostatic ink composition pattern on its surface.

The pattern may then be transferred to an intermediate transfer member, by virtue of an appropriate potential applied between the photoconductor and the intermediate transfer member such that the charged print agent is attracted to the intermediate transfer member. The print agent pattern may then be dried and fused on the intermediate transfer member before being transferred to a print media sheet (for example, adhering to the colder surface thereof). In some examples, the intermediate transfer member is heated.

In other examples, the print apparatus 502 may comprise a different form of print apparatus.

The alert module 506 is operable to generate a user alert indicative of the source of the defects and/or a remedial action. The alert module 506 may generate an audible alert or a visual alarm. The alert produced by the alert module 506 may be produced locally or remotely. Generating the alert may comprise generating any form of an alert, for example changing the display of a screen, sounding an alarm, or the like. In some examples, the indication may comprise an indication of a remedial action, for example, indicate that servicing of a component associated with that defect periodicity within a print apparatus is indicated. The identification of the component indicated may be made based on the periodicity of the periodic defects. In some examples, the alert may be generated during a print run, and in some examples the print run may be interrupted.

Figure 6:
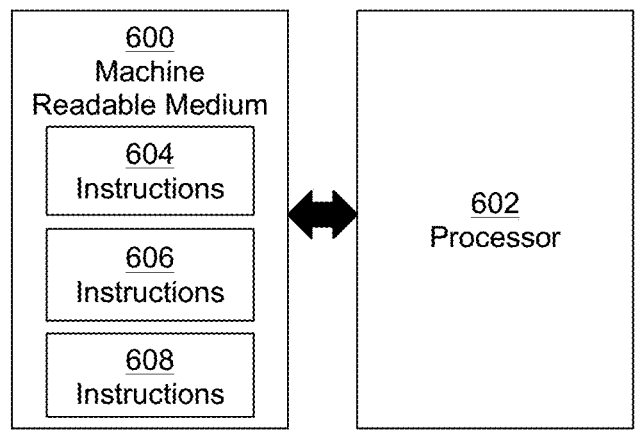
FIG. 6 is an example of a machine readable medium in association with a processor.

FIG. 6 is an example of a tangible, non-transitory, machine readable medium 600 in association with a processor 602. The machine readable medium 600 comprises instructions 604 which, when executed by the processor 602, cause the processor 602 to determine a first separation between defects in a first pair of defects in a printed image, wherein the first separation is a separation between the defects in a predetermined direction. The machine readable medium 600 further comprises instructions 606 which, when executed by the processor 602, cause the processor 602 to determine a second separation between defects in a second pair of defects of defects in a printed image wherein the second separation is a separation between the defects in the predetermined direction. The machine readable medium 600 further comprises instructions 608 which, when executed by the processor 602, cause the processor 602 to determine a print apparatus defect source when the first and second separations meet predetermined criteria.

In some examples, the instructions 608 to determine a print apparatus defect source may further comprise instructions to cause the processor to determine the print apparatus defect source by at least one of: (i) determining if at least one of the first and second separations match a predetermined separation (for example, a characteristic separation, which may be held in a memory or the like), and (ii) comparing the first and second separations and determined if the first and second separations are within a predetermined threshold of one another. In other words, the predetermined criteria may be a separation criteria or a separation difference criteria.

In some examples, the instructions 604 may further comprise an instruction to cause the processor 602 to generate an indication of the defect source. Generating the indication may comprise generating any form of an alert, for example changing the display of a screen, sounding an alarm, or the like. In some examples, the indication may comprise an indication of a remedial action, for example, indicate that servicing or replacement of a particular component, e.g. a binary ink developer within a print apparatus, is advisable. In some examples, the instructions may cause the processor 602 interrupt a print run.

In some examples, the instructions 604, 606, 608 may carry out at least one block of FIG. 1 or 3. In some examples, the instructions 604, 606, 608 may provide at least part of the processing circuitry 404, the image analyser 406, the defect assessment module 408 or the alert module 506.

Aspects of some examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least one flow in the flow charts, as well as combinations of the flows in the flow charts can be realized by machine readable instructions.

The machine readable instructions may, for example, be executed by a general purpose computer, a special purpose computer, an embedded processor or processors of other programmable data processing devices to realize the functions described in the description and diagrams, and which may for example comprises at least part of the processing circuitry 404, the image analyser 406, the defect assessment module 408 or the alert module 506. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims and/or with any other dependent claim(s).

The invention claimed is:

1. A method comprising:
   determining, by a processor, a first separation distance between a first pair of defects in a scanned image of a first printed sheet;
   determining, by the processor, a second separation distance between a second pair of defects in a scanned image of a second printed sheet;
   determining, by the processor, that the defects have a characteristic separation distance responsive to the first and second separation distances each being within a first threshold of a specified separation distance and/or a difference between the first and second separation distances being below a second threshold; and
   determining, by the processor, a source of the defects based on the characteristic separation distance.

2. The method of claim 1, further comprising:
   determining, by the processor, a remedial action relating to the defects, based on the characteristic separation distance.

3. The method of claim 2, further comprising:
   performing the remedial action.

4. The method of claim 1, further comprising:
   acquiring, by the processor, the scanned image of the first printed sheet; and
   acquiring, by the processor, the scanned image of the second printed sheet.

5. The method of claim 1, further comprising:
   printing a first image on a first media sheet to generate the first printed sheet;
   printing a second image on a second media sheet to generate the second print sheet;
   scanning the first printed sheet to generate the scanned image of the first printed sheet; and
   scanning the second printed sheet to generate the scanned image of the second printed sheet.

6. The method of claim 1, further comprising:
   locating, by the processor, the first pair of defects in the scanned image of the first printed sheet; and
   locating, by the processor, the second pair of defects in the scanned image of the second printed sheet.

7. The method of claim 1, further comprising:
   identifying, by the processor, the first pair of defects as defects in the scanned image of the first printed sheet that have a first spatial periodicity along a direction; and
   identifying, by the processor, the second pair of defects as defects in the scanned image of the second printed sheet that have a second spatial periodicity along the direction.

8. The method of claim 1, further comprising:
   determining, by the processor, that the first and second separation distances are each within the first threshold of the specified separation distance.

9. The method of claim 1, further comprising:
   determining, by the processor, that the difference between the first and second separation distances is below the second threshold.

10. The method of claim 1, wherein the first and second separation distances are determined in a direction parallel to a direction of transport of the first and second printed sheets through a print apparatus.

11. A system comprising:
    a print apparatus to print first and second printed sheets;
    a scanning apparatus to scan the first and second printed sheets; and
    a processor to:
       locate first and second pairs of defects in the scanned first and second printed sheets, respectively;
       determine first and second separation distances between the first and second pairs of defects, respectively; and
       determine that the defects have a characteristic separation distance responsive to the first and second separation distances each being within a first threshold of a specified separation distance and/or a difference between the first and second separation distances being below a second threshold.

12. The system of claim 11, wherein the processor is further to:
    determine a source of the defects based on the characteristic separation distance;
    determine a remedial action relating to the defects, based on the characteristic separation distance; and
    perform the remedial action.

13. The system of claim 11, wherein the processor is further to:
    identify the first pair of defects as defects in the scanned first printed sheet that have a first spatial periodicity along a direction; and
    identify the second pair of defects as defects in the scanned second printed sheet that have a second spatial periodicity along the direction.

14. The system of claim 11, wherein the processor is further to:
    determine that the first and second separation distances are each within the first threshold of the specified separation distance.

15. The system of claim 11, wherein the processor is further to:
    determine that the difference between the first and second separation distances is below the second threshold.

16. The system of claim 11, wherein the first and second separation distances are determined in a direction parallel to a direction of transport of the first and second printed sheets through a print apparatus.

17. A non-transitory computer-readable data storage medium storing program code executable by a processor to perform processing comprising:
    determining a first separation distance between a first pair of defects in a scanned image of a first printed sheet;
    determining a second separation distance between a second pair of defects in a scanned image of a second printed sheet;
    determining that the defects have a characteristic separation distance responsive to the first and second separation distances each being within a first threshold of a specified separation distance and/or a difference between the first and second separation distances being below a second threshold.

18. The non-transitory computer-readable data storage medium of claim 17, wherein the processor is further to:
 determine that the first and second separation distances are each within the first threshold of the specified separation distance.

19. The non-transitory computer-readable data storage medium of claim 17, wherein the processor is further to:
 determine that the difference between the first and second separation distances is below the second threshold.

20. The non-transitory computer-readable data storage medium of claim 17, wherein the first and second separation distances are determined in a direction parallel to a direction of transport of the first and second printed sheets through a print apparatus.

* * * * *